Patented Sept. 20, 1949

2,482,377

UNITED STATES PATENT OFFICE 2,482,377

BETA - CYCLOHEXYL - ALPHA - ALPHA - DI - METHYL-ALPHA-DIMETHYL-ALPHA AMINO ETHANE AND SALTS THEREOF

Robert S. Shelton, Mariemont, and Marcus G. Van Campen, Jr., Wyoming, Ohio, assignors to The Wm. S. Merrell Company, Cincinnati, Ohio, a corporation of Delaware No Drawing. Application April 9, 1946,
Serial No. 660,852

2 Claims. (Cl. 260—563)

This invention relates to novel chemical compounds, methods of making the same, and to pharmaceutical preparations in which one or more of said compounds is an active ingredient.

One object of the invention is to produce novel chemical compounds useful as pharmaceuticals and as intermediates for manufacture of other chemicals.

Another object of the invention is to provide effective vasopressor compositions having little or no stimulating effect.

Another object of the invention is to provide beta-cyclohexyl-alpha-alpha - dimethyl - alpha - amino-ethane (beta-cyclohexyl - tertiary - butyl-amine) and methods of synthesizing and purifying same.

It has been known heretofore that many substituted derivatives of beta-phenyl-alpha-amino-ethanes are active pharmaceutical compounds exhibiting vasopressor or vasodilator, mydriatic, sympathomimetic, and/or central stimulant properties in varying degrees. In many cases it is desirable to produce one of these effects without others; thus, in particular it is frequently desirable in cases of common cold and hay fever to shrink the nasal mucosa by application of a vasoconstrictor composition, whereas, any accompanying central stimulant effect may be quite undesirable, particularly as it interferes with sleep.

We have now found that the compound beta-cyclohexyl-alpha-alpha-dimethyl-alpha - amino-ethane (beta-cyclohexyl-tertiary - butyl - amine) and its salts exhibit pharmaceutical properties and particularly vasopressor, mydriatic, etc. action similar to the corresponding beta-phenyl compounds. These compounds although exhibiting extraordinarily good activity as vasopressors, mydriatics and sympathomimetic compounds have relatively slight central stimulant effect. This has been found particularly important because the most satisfactory method of producing the beta-phenyl-alpha-alpha - dimethyl - amino-ethanes as set forth in our parent application Serial No. 438,728, filed April 13, 1942, now Patent No 2,408,345 of which the present application is a continuation-in-part, results in production of both compounds in admixture. Accordingly it is one object of the present invention to provide a mixed therapeutic compound including the corresponding phenyl and cyclohexyl compounds which can be readily prepared and used without separation.

Although we are giving below certain specific examples of our invention and its application in practical use and are giving also certain modifications and alternatives, it should be understood that these are not intended to be exhaustive nor limiting of the invention. On the contrary we are giving these as illustrations and are giving herewith explanations in order fully to acquaint others skilled in the art with our invention and the principles thereof and a suitable manner of its application in practical use, so that others skilled in the art may be enabled to modify the invention and to adapt it and apply it in numerous forms, each as may be best suited to the requirements of a particular use.

I. As an example of the use of these materials a composition particularly suitable for use as a nasal inhalant may be made as follows:

| | Parts |
|---|---|
| Menthol | 1 |
| Camphor | 1 |
| Beta-cyclohexyl-alpha-alpha-dimethyl-alpha-amino-ethane (as the free amine) | 8 |

The camphor and menthol are dissolved in the amine and the solution applied to a pledget of cotton and placed in an inhaler device. The proportions of menthol and camphor may be varied rather widely and they may be replaced by other suitable aromatic or mixture of aromatic substances such as eucalyptol, oil of lavender, oil of rose, etc. Likewise, the proportion of the amine may be increased or decreased substantially.

II. A suitable material for use as aqueous base nose drops may be made as follows:

| | Percent |
|---|---|
| Beta-cyclohexyl-alpha-alpha-dimethyl-alpha-amino ethane (calculated as free amines) | ½ |
| Molecular equivalent of inorganic or organic acid such as hydrochloric, sulfuric, lactic, gluconic, isoasorbic, levulinic and the like | |
| Cetyl pyridinium chloride | 0.033 |
| Aromatics | 0.05 |
| Sorbitol | 4 |
| Distilled water, q. s. | |

We prefer to use organic acid salts rather than mineral acid salts, since in general they are less irritating. The sorbitol in this composition serves to make the product isotonic and should be in amount adjusted to effect that result. The pH of the solution is adjusted to approximately 7. The surface tension of the material is approximately 34.5 dynes per sq. centimeter.

III. A suitable composition for use as an oil base nose drop may be made as follows:

| | Parts |
|---|---|
| Beta-cyclohexyl-alpha-alpha-dimethyl-alpha-amino ethane | 0.5 |
| Oil of eucalyptus | 1.0 |
| Mineral oil | 98.5 |

The free amine may be used in this composition or any of its oil soluble, e. g., fatty acids, salts, such as the oleate, palmitate, etc. The oil of eucalyptus may, of course, be replaced by other aromatics commonly used in nose drops, such as varying proportions of menthol, camphor, thymol, etc., and the mineral oil may be replaced by a vegetable oil such as peanut oil, cotton-seed oil, sesame oil, etc.

IV. A nasal jelly may be prepared as follows:

| | Percent |
|---|---|
| Beta-cyclohexyl-alpha-alpha-dimethyl-alpha-amino ethane | 0.5 |
| Cetyl pyridinium chloride | 0.1 |
| Tragacanth | 1.0 |
| Glycerine | 15.0 |
| Methyl salicylate | 0.005 |
| Eucalyptol | 0.005 |
| Oil dwarf pine needles | 0.005 |
| Distilled water | 83.25 |

V. For internal administration the compound may be included in tablets of suitable composition, for example:

| | Mgs. per tablet |
|---|---|
| Beta-cyclohexyl-alpha-alpha-dimethyl alpha-amino ethane | 25 |

Mixed in a base consisting of approximately:

| | Parts |
|---|---|
| Milk sugar | 50 |
| Cornstarch | 5 |
| Talc | 1 |
| Stearic acid | 1 |
| Accacia | 10 |

And compressed into an uncoated tablet of approximately 2.8 grains.

Instead of compounding the amine in a tablet base it may be added to a suitable syrup or other vehicle for internal administration.

As will be appreciated from the above the use of this amine compound is very similar to other vasopressor amines and in general may be used in the same manner. Those skilled in the art will have no difficulty in utilizing it in widely different types of compositions and substituting it in such compositions for previously used amines of this general class.

The corresponding secondary amines and amine salts are similarly valuable for the same purposes excepting that as the chain length of the substituent on the amino group is increased the action may change from a vasopressor to a vasodilator. It is therefore advantageous to use ethyl amino, allyl amino, vinyl amino or methyl amino compounds where vasopressor effect is desired rather than the higher secondary amines.

As stated above one advantage of the present invention is that the corresponding phenyl and cyclohexyl compounds having a similar action may be used in admixture or without separation when produced together. Thus for example in any of the formulations given above the corresponding phenyl compound may be substituted for a part of the cyclohexyl compound as may be desired.

The following example will illustrate a method of preparing this compound in accordance with my invention although, as will be evident to those skilled in the art, various equivalent substances may be used in place of those mentioned and various equivalent procedures may be used instead of the particular steps described:

*Preparation of beta-cyclohexyl-beta-chloro-alpha-amino-alpha-alpha-dimethyl ethane hydrochloride*

A mixture of equal parts by weight of beta-phenyl-beta-hydroxy-alpha-amino-alpha-methyl propane hydrochloride and thionyl chloride are allowed to stand at ordinary temperature (25–35° C.) for 10 to 15 hours, then warmed to 70° C. The solid which results is then powdered and washed with 200 to 300 cc. of ligroin, and finally dried over soda lime. The resulting beta-phenyl-beta-chloro-alpha-amino-alpha-alpha- dimethyl ethane hydrochloride is about 95% pure and is of advantageously purified before further use. For purification 60 parts of the crude material is dissolved in 120 parts of hot alcohol and poured into 360 parts of ether, cooled, and the pure hydrochloride salt filtered and dried. The yield of purified material is about 80% of the theory.

*Preparation of beta-cyclohexyl-alpha-amino-alpha-alpha-dimethyl ethane*

15 parts of the above beta-phenyl-beta-chloro-alpha-amino-alpha-alpha-dimethyl ethane hydrochloride, are dissolved in 150 parts of alcohol, and 5 parts of catalytic platinum added. The mixture is then reduced in a conventional hydrogenation apparatus with hydrogen at 50–80° C. and under 50 lbs. pressure. When hydrogen is no longer readily absorbed, the solution is removed, the catalytic platinum filtered and the filtrate evaporated. The residue is dissolved in dilute hydrochloric acid, shaken with ether and the ether discarded. The acid solution is then made alkaline, as with sodium hydroxide, and the amine extracted with ether. The ether solution may (1) be dried and distilled to give a desired mixture of beta-phenyl-alpha-alpha-dimethyl-alpha-amino ethane (alpha-benzyl-isopropyl amine) and beta-cyclohexyl-alpha-alpha-dimethyl-alpha-amino ethane or (2) the ether solution may be dried and saturated with hydrogen chloride and the precipitated hydrochloride recrystallized from a mixture of 50 parts alcohol and 100 parts of acetone.

Other halogeno compounds may be used instead of the chloro compound.

Instead of catalytic platinum, palladium on charcoal or Raney nickel may also be employed. Platinum oxide (Adams) or other oxide of the catalytic metals can be used but it is believed that these are reduced by the reactants, and therefore it is preferable to use the free metal.

The presence of an alkaline carrier such as an alkaline earth oxide or carbonate particularly with palladium and with platinum favors the production of the phenyl compound and should therefore be avoided if the cyclohexyl compound is to be preferred. In any case, the solution during hydrogenation should be acid and should not be sufficiently alkaline to remove the hydrochloric acid from the amine group as that would permit the amino ethane compound to react with itself. In general alkalinity at the reacting surface will favor the formation of the phenyl compound whereas acidity will favor production of the cyclohexyl compound and therefore where higher yield of the cyclohexyl compound is desired the reaction medium should be acid and the catalyst carrier should be non-alkaline. Continued hydrogenation even with alkaline carriers tends to increase the proportion of the cyclohexyl compound.

As another example the beta-cyclohexyl-alpha-alpha-dimethyl-amino ethane compounds can be produced from beta-phenyl-alpha-alpha-dimethyl-amino ethane previously produced by any method. Thus to a solution of beta-phenyl-tertiary-butyl-amine (10 grams) in glacial acetic acid (200 ml.) was added a platinum-palladium catalyst (1-2 grams). The mixture was subjected to the action of hydrogen at room temperature and an initial pressure of approximately three atmospheres. When the absorption of hydrogen had ceased the catalyst was removed by filtration. The solvent was evaporated and the residue was taken up in ether and washed with dilute alkali to remove the residual acetic acid. The ether solutions from six such reductions were combined and the ether evaporated to obtain crude beta-cyclohexyl-tertiary-butyl-amine (42 grams). This product was distilled under diminished pressure through an efficient column. B. P.: 104.3-106°/35 mm. Yield 27.8 grams. This amine was taken up in ether and acidified with alcoholic hydrogen chloride.

The beta-cyclohexyl-tertiary-butyl-amine hydrochloride thus obtained was recrystallized twice from an ether-butanone mixture. Yield: 21 grams. M. P.: 153-153.8. $Cl_F$: 18.40%; $Cl_T$: 18.49%.

What we claim is:

1. Beta-cyclohexyl-alpha-alpha-dimethyl-alpha-amino ethane.
2. Beta-cyclohexyl-alpha-alpha-dimethyl-alpha-amino ethane and the salts thereof.

ROBERT S. SHELTON.
MARCUS G. VAN CAMPEN, Jr.

REFERENCES CITED

The following references are of record in the file of this patent:

UNITED STATES PATENTS

| Number | Name | Date |
|---|---|---|
| 1,907,820 | Jaeger | May 9, 1933 |
| 2,163,181 | Ulrich et al. | June 20, 1939 |
| 2,408,345 | Shelton et al. | Sept. 24, 1946 |

OTHER REFERENCES

Sabatier et al., Compt. Rend., vol. 138, page 1258 (1904).

Hiers et al., Ber. Deut. Chem., vol. 59, page 162 (1926).

Coleman et al., J. Am. Chem. Soc., vol. 54, pages 1982-1984 (1932).

Gunn et al., Physiol., vol. 97, pages 453-470 (1940).

Mentzer, Compt. rend., vol. 213, pages 581-584 (1941).